(12) United States Patent
Kwon et al.

(10) Patent No.: US 7,297,320 B2
(45) Date of Patent: Nov. 20, 2007

(54) SPHERICAL CARBONS AND METHOD FOR PREPARING THE SAME

(75) Inventors: Ou-Jung Kwon, Seoul (KR); Seung-Mo Oh, Anyang (KR); Ki-Young Lee, Taejeon (KR); Myung-Hwan Kim, Taejeon (JP); Kyu-Tae Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 642 days.

(21) Appl. No.: 10/297,174

(22) PCT Filed: Apr. 17, 2002

(86) PCT No.: PCT/KR02/00707

§ 371 (c)(1),
(2), (4) Date: Dec. 3, 2002

(87) PCT Pub. No.: WO02/083557

PCT Pub. Date: Oct. 24, 2002

(65) Prior Publication Data

US 2003/0147800 A1 Aug. 7, 2003

(30) Foreign Application Priority Data

Apr. 17, 2001 (KR) .................. 2001-20462
Sep. 14, 2001 (KR) .................. 2001-56846

(51) Int. Cl.
*C01B 31/02* (2006.01)
(52) U.S. Cl. .................. 423/448; 423/445 R; 502/9
(58) Field of Classification Search ............ 423/445 R, 423/448; 502/9, 418, 423
See application file for complete search history.

(56) References Cited

U.S. PATENT DOCUMENTS

| 4,273,675 A | 6/1981 | Shiiki et al. |
| 4,996,009 A | 2/1991 | Hasegawa |
| 6,261,469 B1 * | 7/2001 | Zakhidov et al. ............ 216/56 |

OTHER PUBLICATIONS

Oya et al, 'Influces of Particle Size of Metal On Catalytic Graphitization of Non Graphitizing Carbons' in *Carbon* vol. 19 No. 5 pp. 391-400, no month, 1981.*

* cited by examiner

*Primary Examiner*—Stuart Hendrickson
(74) *Attorney, Agent, or Firm*—Birch, Stewart, Kolasch & Birch, LLP (57) ABSTRACT

The present invention provides a method for preparing spherical carbon comprising step of heat-treating a mixture of a carbon precursor and dispersion media, a spherical non-graphitizable carbon using the same, and a method for preparing spherical artificial graphite.

20 Claims, 8 Drawing Sheets

SPHERICAL CARBONS AND METHOD FOR PREPARING THE SAME

This application is the national phase under 35 U.S.C. § 371 of PCT International Application No. PCT/KR02/00707 which has an International filing date of Apr. 17, 2002; which designated the United States of America.

BACKGROUND OF THE INVENTION (a) Field of the Invention

The present invention relates to spherical carbon, and particularly to spherical carbon with a size of several to several tens of micrometer that can be used for anode active material for a lithium secondary battery. The present invention also relates to a method for preparing the spherical carbon.

(b) Description of the Related Art

As anode active material for a lithium secondary battery, graphite material such as natural graphite and artificial graphite, non-graphitizable carbon or hard carbon, graphitizable carbon or soft carbon, etc. are used. Graphitized g-MCMB (Graphitized MesoCarbon MicroBeads, product of Japan Osaka Gas Chemical Co.), which is one type of artificial graphite, is used the most.

The reasons why g-MCMB is preferred are that a battery using the material has a high energy density per battery volume because the size of carbon particles is several to several tens of micrometers and thus g-MCMB can achieve a high rate of packing in a battery, and a battery employing g-MCMB has a small initial irreversible capacity because the carbon particles are spherical such that they have a small specific surface area. Initial irreversible capacity refers to the charge required for forming a passivation film while electrolyte is decomposed on a surface carbon when initially charging a lithium secondary battery, and the required packing is a factor in limiting battery capacity because it cannot be used in a subsequent discharge process. Such film forming is an unavoidable process when using carbon material as an anode. It is therefore important to minimize film forming, which is possible by minimizing the specific surface area of carbon that is used as an anode material.

Non-graphitizable carbon is produced by carbonizing a resin precursor at 700 to 1500° C. under inert atmosphere. Hence, non-graphitizable carbon has a low unit cost of production compared to artificial graphite requiring a high temperature heat treatment of 2500° C. or more. Further, non-graphitizable carbon has a reversible capacity of 400 mAh/g or more compared to graphite carbon (natural carbon, artificial carbon such as g-MCMB), which has a reversible capacity of approximately 300 mAh/g (the theoretical reversible capacity is 372 mAh/g).

Practically, there are two reasons why non-graphitizable cannot be widely used for a battery.

First, the crystallinity of non-graphitizable carbon is not high and non-graphitizable carbon includes fine pores and thus has a low density, while graphite carbon has a crystalline structure with a high crystallinity and well-developed graphite layers and thus it has a high density. Since the non-graphitizable carbon has a low density, the volume of an anode becomes large if it is packed in a battery such that the energy density per battery volume becomes low. Specifically, assuming that carbon of the same weight is packed, non-graphitizable carbon occupies more volume than graphite carbon.

Second, general non-graphitizable carbon must undergo a pulverizing process in order to be used for a battery because it is produced in a massive form. Particles of pulverized carbon have an irregular shape and a large specific surface area. A packing density becomes low because the shapes of the particles are irregular, and, because of the large specific surface area, an initial irreversible capacity becomes large such that an initial coulomb efficiency is lowered.

Accordingly, in order to take advantage of the inexpensive cost and high reversible capacity properties of non-graphitizable carbon, a method for making particles of the carbon spherical requires examination. Specifically, if the particles of non-graphitizable carbon are spherical, a tap density will be high, thereby allowing a large amount of the carbon to be packed. Also, the specific surface area of the carbon will be small and thus an initial irreversible capacity can decrease. If non-graphitizable carbon can be produced in spherical form, the problems of non-spherical non-graphitizable carbon, i.e., a low packing density and large initial irreversible capacity, can be simultaneously solved.

Graphitizable carbon refers to carbon that becomes artificial carbon when heat-treated at a high temperature of 2500° C. or more after carbonizing a pitch precursor at 700 to 1500° C. under inert atmosphere. As spherical artificial carbon, G-MCMB is widely used, which is prepared by heat-treating pitch at 300 to 500° C. to make mesophase spherulite, then by performing the processes of cooling, extracting with solvent, carbonizing and graphitizing. However, this process has a low yield and the production cost is high.

SUMMARY OF THE INVENTION

The present invention is made in consideration of the problems of the prior art. It is an object of the present invention to provide spherical carbon having a high tap density and a small specific surface area, and to provide a method for preparing the same.

It is another object of the present invention to provide spherical carbon and a method for preparing the same, in which the spherical carbon can increase a packing density when used as anode active material for a lithium secondary battery and thus increase battery capacity per unit volume, and has a small specific surface area and thus decrease an initial irreversible capacity.

It is yet another object of the present invention to provide non-graphitizable spherical carbon that can be prepared by a simpler method than that used for the existing non-graphitizable carbon, and a method for preparing the same.

It is still yet another object of the present invention to provide graphitizable spherical carbon that can be prepared by a simpler method than that used for the existing graphitizable carbon, and a method for preparing the same.

It is still yet another object of the present invention to provide a method for preparing spherical artificial graphite that can be prepared by a simpler method than that used for the existing artificial graphite.

It is still yet another object of the present invention to provide a method for preparing a spherical carbon precursor that can be used for various uses.

In order to achieve these objects, the present invention provides a method for preparing spherical carbon comprising the step of heat-treating a mixture of a carbon precursor and a dispersion media.

The present invention also provides a method for preparing spherical artificial graphite comprising the steps of a) heat-treating a mixture of a carbon precursor and a dispersion media; and b) heat-treating a spherical carbon precursor or spherical carbon prepared by heat-treating at 2000 to 3200° C.

The present invention also provides spherical non-graphitizable carbon comprising 10 wt % or more of spherical particles satisfying the following Mathematical Formula 1:

$$0.99 \leq a/b \leq 1 \quad \text{[Mathematical Formula 1]}$$

where a is the minor axis of a particle, and b is the major axis of a particle.

The present invention also provides a battery comprising the spherical carbon or spherical artificial graphite as anode material.

The present invention also provides a method for preparing a spherical carbon precursor comprising the step of heat-treating a mixture of a carbon precursor and a dispersion media at a glass transition temperature or a softening temperature of the carbon precursor to 600° C.

DETAILED DESCRIPTION AND THE PREFERRED EMBODIMENTS

The present invention will now be explained in detail.

The present invention provides spherical carbon and spherical artificial graphite that can be used as anode active material for a lithium secondary battery, and a method for preparing the same. The present invention adds a dispersion media of silicone oil or an inorganic substance, a surface of which is treated so as to have hydrophobicity, to a carbon precursor resin, pitch, etc. to mix these substances, then heat-treats the mixture to make the carbon precursor spherical.

If a carbon precursor is directly carbonized or graphitized, carbon of a massive form will be obtained. Accordingly, it is necessary to perform a pulverization process in order to enable use as electrode material. Pulverized carbon particles have non-spherical irregular shapes, and thus have a low packing density and a large specific surface area compared to spherical carbon.

However, the hydrophobic inorganic substance or silicone oil dispersion media of the present invention makes a carbon precursor convert into spherical carbon during heat-treating process.

Specifically, when the carbon precursor is composed of irregular anisotropic pitch particles, if the pitch is mixed with the hydrophobic inorganic substance or silicone oil and heat-treated at a softening temperature of the pitch or more, compounds comprising the pitch become fluid and convert into mesophase. At this time, mesophase pitch particles tend to cohere to each other, but the mixed hydrophobic inorganic substance or silicone oil blocks this process of the pitch particles to restrain their cohesion. Therefore, since each mesophase pitch particle that is separately dispersed has a tendency of minimizing surface energy, the carbon precursor converts into a spherical form that has the lowest surface energy.

Further, when the carbon precursor is a resin, if heat-treated at a temperature above the glass transition temperature of the resin, the polymer chain becomes more fluid, and since the hydrophobic inorganic substance or silicone oil restrains cohesion between resin particles, resin particles convert into spherical form in order to minimize surface energy.

Accordingly, the hydrophobic inorganic substance or silicone oil of the present invention is distributed on the surface of carbon precursor particles to restrain the cohesion of precursor particles during heat-treatment, and, when the precursor particles contract, provides a high surface tension to make the particles convert into spherical form. After such heat-treatment, a dispersion media is removed to obtain a spherical carbon precursor or spherical carbon with a high purity. Whether a spherical carbon precursor or spherical carbon is obtained is determined by a temperature for heat-treating the non-spherical carbon precursor together with a dispersion media. Also, spherical artificial graphite can be obtained by heat-treating the spherical carbon precursor or spherical carbon at a high temperature.

The spherical carbon of the present invention has a high tap density and thus when used as anode active material for a lithium secondary battery, a large quantity thereof can be packed. Also, the spherical carbon of the present invention has a small specific surface area such that its initial irreversible capacity becomes low (a high initial coulomb efficiency).

The spherical carbon particles can be classified into three types: one is non-graphitizable spherical carbon prepared using resin or isotropic pitch as a carbon precursor, a second is graphitizable spherical carbon prepared using anisotropic pitch as a carbon precursor, and the third is spherical artificial graphite prepared by heat-treating the graphitizable spherical carbon at a high temperature. Particularly, spherical artificial graphite can be easily prepared by heat-treating a dispersion media-removed spherical carbon precursor or spherical carbon at 2500° C. or more, preferably 2000 to 3200° C.

Among the different types of spherical carbon, spherical non-graphitizable carbon has not been able to be prepared until now. The spherical non-graphitizable carbon comprises at least 10 wt % of particles having a minor-axis-to-major-axis ratio of 0.99 to 1 (satisfying the above Mathematical Formula 1). The remaining particles may have a minor-axis-to-major-axis ratio of 0.1 to 0.99 (satisfying the Mathematical Formula 2 below):

$0.1 \leq a/b < 0.99$ [Mathematical Formula 2]

where a is the minor axis of a particle, and b is the major axis of a particle.

In addition, the average diameter of the particles is 1 to 40 μm and a specific surface area is 3 $m^2/g$ or less.

Thus prepared non-graphitizable carbon, if used as anode active material for a lithium secondary battery, has a high packing density and a low initial irreversible capacity (a high initial coulomb efficiency) compared to non-spherical non-graphitizable carbon. In practice, when the spherical non-graphitizable carbon of the present invention is used as anode active material to comprise half of a battery as shown in Example 11, a long flat curve portion appears between 0.00 to 0.2 V (for Li/Li+) in a discharge curve (when lithium gets out of carbon material).

According to the present invention, spherical graphitizable carbon can also be prepared. If the spherical graphitizable carbon is graphitized to prepare artificial graphite, the preparation process is simpler and the yield is higher than g-MCMB. The graphitizable carbon, and artificial carbon prepared therefrom show a particle distribution, a diameter, and a specific surface area similarly to the spherical non-graphitizable carbon.

The method for preparing spherical carbon of the present invention will now be explained.

According to the present invention, the spherical carbon is prepared by the following two methods.

That first method comprises a) heat-treating a mixture of a carbon precursor and a hydrophobic inorganic dispersion media at 700 to 1500° C. under inert atmosphere to carbonize the mixture; and b) adding an acid or alkali solvent to the a) carbide to remove inorganic substance.

The second method comprises a) heat-treating a mixture of a carbon precursor and a silicone oil dispersion media at a glass transition temperature or a softening temperature of the carbon precursor to 300° C. to make the carbon precursor spherical;

b) adding an organic solvent to the a) spherical carbon precursor to remove silicone oil; and c) heat-treating the b) spherical carbon precursor at 700 to 1500° C. under inert atmosphere to carbonize the spherical carbon precursor.

As the carbon precursors used for preparing spherical carbon, those of solid powder form that can be mixed with a dispersion media, i.e., a hydrophobic inorganic substance or silicone oil, can be used. Therefore, the kinds of the precursors are not specifically limited, and resin, pitch or a mixture thereof can be used according to need. For preparing spherical non-graphitizable carbon, resin or isotropic pitch is preferably used as the carbon precursor.

The isotropic pitch includes isotropic petroleum pitch or isotropic coal tar pitch, etc., and these are used after oxidation. As the resin, thermosetting synthetic resin is preferable. The thermosetting synthetic resin is selected from the group consisting of phenolic resins, furan resin, epoxy resin, polyacrylonitrile resin, polyimide resin, polybenzimidazole resin, polyphenylene resin, biphenol resin, divinylbenzene styrene copolymer, cellulose and a mixture thereof.

In addition, for preparing spherical graphitizable carbon, pitch is preferably used as the carbon precursor. The pitch may be petroleum pitch or coal tar pitch, and pitch derived from naphthalene or methyinaphthalene can be used.

For preparing spherical carbon of the present invention, a hydrophobic inorganic substance or silicone oil dispersion media is added to the carbon precursor and heat-treated. If the carbon precursor is heat-treated without introducing a hydrophobic inorganic substance or silicone oil dispersion media, non-spherical mass carbon will be obtained. However, if a hydrophobic inorganic substance or silicone oil dispersion media is added to the carbon precursor then heat-treated, spherical carbon can be obtained.

As the hydrophobic inorganic substance used as a dispersion media, those having a hydrophobic surface can be used Silica, zeolite, alumina, titania ($TiO_2$), ceria ($CeO_2$), etc., surface of which are hydrophobically treated, are examples that can be used. Other kinds of inorganic substances can be used if appropriate for the present invention. Particularly, silica is preferable because it can be easily dissolved in weak acid or a weak alkali solution and removed, and because it is low cost and has a small particle size.

Silica surface-treated with a hydrophobic substance includes CAB-O-SIL TS-720, TS-610, TS-530, TS-500, TG-308F, TG-810G530, etc. from Cabot Company; and AEROSIL R972, R974, R812, R812S, R202, etc. from Deggusa Company. As the inorganic substance, a commercial product can be used or an inorganic substance can be made hydrophobic.

For making inorganic substance hydrophobic, it is preferable to add an inorganic substance, which has a non-hydrophobic surface, to a solvent such as toluene together with an organosilane surface-treating agent such as trimethyichlorosilane, and to reflux the mixture while agitating the same to prepare an inorganic substance having a hydrophobic surface.

The mixing ratio of the carbon precursor and the hydrophobic inorganic substance is preferably 100:0.1 to 1000 by weight ratio. If the contents of the hydrophobic inorganic substance are less than 0.1 weight parts per 100 weight parts of the carbon precursor, spherical carbon is difficult to prepare, and if more than 1000 weight parts, the effects corresponding to the contents cannot be obtained (i.e., a direct relation between contents and effects does not result).

As the silicone oil used for a dispersion media, silicone oil that does not dissolve carbon precursor resin or pitch and does not have reactivity must be used. Further, it is preferable to select silicone oil that has a higher specific gravity than resin or pitch such that resin or pitch can be effectively dispersed, and so that cohesion can be restrained. If silicone oil having a lower specific gravity than resin or pitch is used, it is preferable to reduce a corresponding amount of resin or pitch to restrain cohesion between particles. In addition, sinking of resin or pitch particles to the bottom of a reactor and cohesion thereof can be restrained through agitation.

The mixing ratio of the carbon precursor and the silicone oil is preferably 100:0.1 to 100000 by volume ratio. If the contents of the silicone oil are less than 0.1 volume parts per 100 volume parts of carbon precursor, spherical carbon is difficult to prepare, and if more than 100000 volume parts, effects corresponding to the contents cannot be obtained (i.e., a direct relation between contents and effects does not result).

The dispersion media of the present invention is removed after producing a spherical carbon precursor or spherical carbon. The dispersion media can be removed by adding solvent to dissolve it. The solvent is selected on the basis of how well it dissolves dispersion media while not dissolving resin or pitch.

If hydrophobic inorganic substance is used for the dispersion media, an acid or alkali solution is selected for use as a removing solvent. If hydrophobic silica is selected for the hydrophobic inorganic substance, hydrofluoric acid solution or alkali solution, etc. can be used as a removing solution. For example, if hydrofluoric acid is used, spherical carbon covered with silica is agitated in 20 to 50 wt % of a hydrofluoric acid solution at room temperature for 30 minutes to 48 hours to dissolve the silica, thereby removing the same.

Further, if silicone oil is used as the dispersion media, an organic solvent is selected as a removing solvent. The organic solvent is preferably alcohol, and more preferably ethyl alcohol.

According to the present invention, for preparing spherical carbon, a carbon precursor is carbonized. The first method uses a hydrophobic inorganic substance as a dispersion media, and thus a carbon precursor is carbonized while directly made spherical during the carbonizing process. The carbonization is conducted by heat-treating a mixture of a carbon precursor and a hydrophobic inorganic substance at 700 to 1500° C. under inert atmosphere (for example, argon, nitrogen, helium, etc,), and spherical carbon is directly prepared during the heat-treating process. Heat-treating is preferably conducted for 1 minute to 50 hours, and a speed for elevating the temperature to a heat-treating temperature is preferably 0.1 to 100° C./min.

The second method uses silicone oil as a dispersion media, and thus a mixture of a carbon precursor and silicone oil is primarily heat-treated at a temperature lower than a carbonization temperature of the carbon precursor to make the carbon precursor spherical, and silicone oil is removed and then the carbon precursor is secondly heat-treated at a temperature higher than the carbonization temperature of the carbon precursor.

Since most of the silicone oil is decomposed at 300° C. or higher during the first heat-treatment, if resin is used as a carbon precursor, heat-treatment is conducted at a temperature more than a glass transition temperature of the resin less than 300° C., and if pitch is used as a carbon precursor, heat-treatment is conducted at a temperature more than a softening temperature of the pitch less than 300° C. If hydrophobic inorganic substance is used as a dispersion media instead of silicone oil in the second method, a temperature for making the carbon precursor spherical may be up to 600° C., at which point the carbon precursor is not carbonized.

The spherical carbon precursor prepared using silicone oil as a dispersion media is secondly heat-treated under the same carbonization conditions as using a hydrophobic inorganic substance dispersion media. In order to prepare spherical carbon that maintains a spherical form and does not have cracks, it is preferable to perform oxidative stabilization a carbon precursor at 100 to 400° C. for 1 minute to 2 hours under air atmosphere. Such an oxidative stabilization step is more preferable for preparing artificial graphite.

The method for preparing spherical artificial graphite of the present invention will now be explained.

The spherical graphite of the present invention is prepared by heat-treating the above-explained spherical graphitizable carbon at a high temperature to graphitize the carbon, or by directly heat-treating a spherical carbon precursor at a high temperature to graphitize the precursor.

More specifically, the spherical graphite can be prepared by the following 5 methods.

The first method comprises
a) heat-treating a mixture of a carbon precursor and a hydrophobic inorganic substance dispersion media at 700 to 1500° C. under inert atmosphere to carbonize the precursor;
b) adding an acid or alkali solvent to the a) carbide to remove the inorganic substance; and
c) heat-treating the b) spherical carbon at 2000 to 3200° C.

The second method comprises
a) heat-treating a mixture of a carbon precursor and a hydrophobic inorganic substance dispersion media at a softening temperature of the carbon precursor to 600° C. to make the carbon precursor spherical;
b) adding an acid or alkali solvent to the a) spherical carbon precursor to remove the inorganic substance;
c) performing oxidative stabilization of the b) spherical carbon precursor at 100 to 400° C. for 1 minute to 2 hours under air atmosphere;
d) heat-treating the c) spherical carbon precursor at 700 to 1500° C. under inert atmosphere to carbonize the precursor; and
e) heat-treating the d) spherical carbon at 2000 to 3200° C.

The third method comprises
a) heat-treating a mixture of a carbon precursor and a hydrophobic inorganic substance dispersion media at a softening temperature of the carbon precursor to 600° C. to make the carbon precursor spherical;
b) adding an acid or alkali solvent to the a) spherical carbon precursor to the remove inorganic substance;
c) performing oxidative stabilization of the b) spherical carbon precursor at 100 to 400° C. for 1 minute to 2 hours under air atmosphere; and
d) heat-treating the c) spherical carbon at 2000 to 3200° C.

The fourth method comprises
a) heat-treating a mixture of a carbon precursor and a silicone coil dispersion media at a softening temperature of the carbon precursor to 300° C. to make the carbon precursor spherical;
b) adding an organic solvent to the a) spherical carbon precursor to remove the silicone oil;
c) performing oxidative stabilization of the b) spherical carbon precursor at 100 to 400° C. for 1 minute to 2 hours under air atmosphere;
d) heat-treating the c) spherical carbon precursor at 700 to 1500° C. under inert atmosphere to carbonize the precursor; and
e) heat-treating the d) spherical carbon at 2000 to 3200° C.

The fifth method comprises
a) heat-treating a mixture of a carbon precursor and a silicone oil dispersion media at a softening temperature of the carbon precursor to 300° C. to make the carbon precursor spherical;
b) adding an organic solvent to the b) spherical carbon precursor to remove the silicone oil;
c) performing oxidative stabilization of the b) spherical carbon precursor at 100 to 400° C. for 1 minute to 2 hours under air atmosphere; and
d) heat-treating the c) spherical carbon precursor at 2000 to 3200° C.

These methods for preparing artificial graphite use the above-explained methods for preparing spherical carbon and a spherical carbon precursor. In addition to the above 5 methods, various other methods can be used to prepare spherical artificial graphite by varying the selection of a carbon precursor and a dispersion media.

In addition, the present invention provides a method for preparing spherical carbon comprising the step of heat-treating a mixture of a carbon precursor and a dispersion media at a glass transition temperature of the carbon precursor to 600° C. The temperature of 600° C. is a temperature at which a carbon precursor does not convert into carbon and can exist as a carbon precursor. Thus the prepared spherical carbon precursor comprises 10 wt % or more of spherical particles satisfying the above Mathematical Formula 1 identically as with the spherical carbon. The spherical carbon precursor can be used for various uses such as a material for a Braun tube.

The spherical non-graphitizable carbon and spherical artificial graphite of the present invention, which comprise 10 wt % or more of spherical particles satisfying the above Mathematical Formula 1, are suitable for anode active material for a battery such as a lithium secondary battery.

In order to use the spherical carbon of the present invention as anode active material for a lithium secondary battery, an electrode is formed. For example, the spherical carbon prepared according to the above method and a binder are added to a dispersion media at a weight ratio of 10:0.1 to 2 and agitated to prepare a paste, and then the paste is coated on a metal material used as a current collector, compressed and dried to prepare an electrode of a laminate shape.

Representative examples of the binder include polytetrafluoroethylene (PTFE), polyvinylidene fluoride (PVdF), and cellulose, and examples of the dispersion media include isopropyl alcohol, N-methylpyrrolidone (NMP), and acetone.

As the metal material used as a current collector, any metal that has a high conductivity and to which the paste can be easily adhered can be used. Representative examples include mesh and foil comprised of copper or nickel.

A method for uniformly coating the metal material using a paste of electrode material can be selected from known methods or conducted by a new appropriate method in consideration of the properties of the material. One example is to distribute a paste on a current collector and uniformly dispersing the paste using a doctor blade, etc. Depending on the circumstances, the distribution and dispersion processes can be conducted in one process. Additional examples include die-casting, comma coating, and screen-printing, or a process by which an electrode is formed on a separate substrate and then joined to a current collector by pressing or using a lamination method.

A method for drying a coated paste includes drying in a vacuum oven set at 50 to 200° C. for 1 to 3 days. Depending on the circumstances, in order to further reduce a resistance of an electrode, 0.1 to 20 wt % of carbon black can be added as a conducting material. Commercial conducting material includes acetylene black (product of Chevron Chemical Company or Gulf Oil Company), Keyjenblack EC (product of Armak Company product), Vulcan XC-72 (product of Cabot Company), and Super P (product of MMM Company).

In an example to construct a lithium secondary battery using the electrode prepared according to the above method, the electrode is used as an anode and $LiCoO_2$, $LiNiO_2$, $LiMn_2O_4$, etc. are used as a cathode, and a separator film is inserted therebetween. The separator film functions to block the internal short-circuit of two electrodes and to impregnate an electrolyte. Polymer, a glass fiber mat, and kraft paper can be used as the separator film. Examples of commercially available products include Celgard 2400, 2300 (product of Hoechest Celanese Corp.) and polypropylene membrane (product of Ube Industries Ltd. or Pall RAI Company).

The electrolyte is a system dissolving lithium salts in an organic solvent, and as the lithium salts, $LiClO_4$, $LiCF_3SO_2$, $LiAsF_6$, $LiBF_4$, $LiN(CH_3SO_2)_2$, $LiPF_6$, $LiSCN$ and $LiC(CF_3SO_2)_3$, etc. can be used, and as the organic solvent, ethylene carbonate, propylene carbonate, diethyl carbonate, dimethylcarbonate, 1,2-dimethoxyethane, 1,2-diethoxyethane, gamma-butyrolactone, tetrahydofuran, 2-methyltetrahydrofuran, 1,3-dioxolane, 4-methyl-1,3-dioxoalne, diethyl ether, sulfolane, and a mixture thereof can be used.

The present invention will be explained in more detail with reference to the following Examples. However, the Examples act merely to illustrate the present invention and are in no way do they limit the present invention.

EXAMPLES

Example 1

(Preparation of Spherical Non-graphitizable Carbon using Resin as a Precursor and a Hydrophobic Inorganic Substance as a Dispersion Media)

Figure 1:
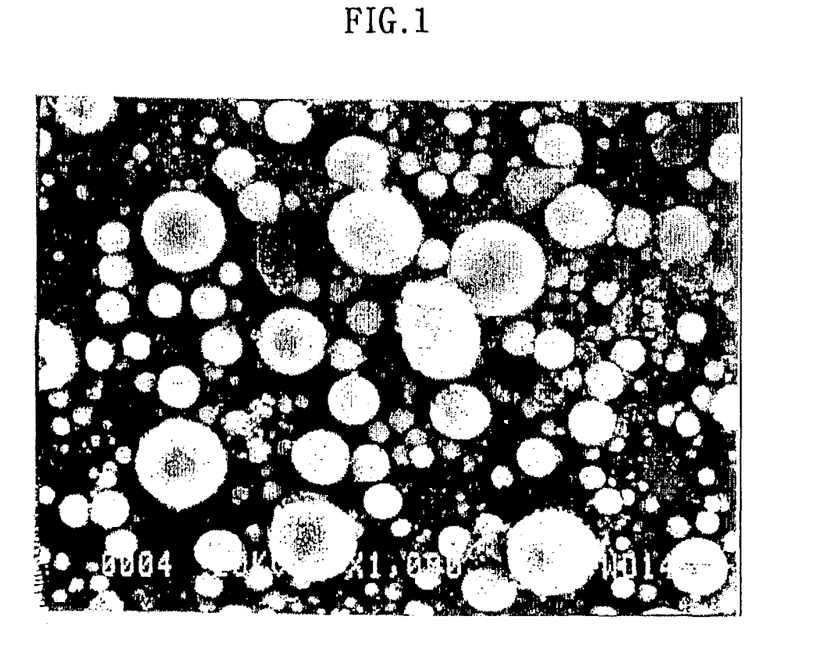
FIG. 1 is a photograph of the spherical carbon of Example 1 by Scanning Electron Microscopy with a magnifying power of 1000.

After mixing a phenolic resin precursor with CAB-O-SIL TS-530 fumed silica, a surface of which is treated with hexamethyldisilazane, at a weight ratio of 10:0.5, the mixture was heated at a temperature-elevation speed of 10° C./min. under argon gas atmosphere and heat-treated at 1000° C. for 1 hour to obtain spherical carbon. The prepared spherical carbon showed 50 to 55 wt % of carbonization yield. FIG. 1 is a Scanning Electron Microscopy photograph of the prepared carbon.

Example 2

(Preparation of Spherical Non-graphitizable Carbon using Resin as a Precursor and a Hydrophobic Inorganic Substance as a Dispersion Media)

Spherical carbon was prepared by the same method as in Example 1, except that there was used CAB-O-SIL TS-720 fumed silica, a surface of which is treated with polydimethylsiloxane.

Example 3

(Preparation of Spherical Non-graphitizable Carbon using Resin as a Precursor and a Hydrophobic Inorganic Substance as a Dispersion Media)

Spherical carbon was prepared by the same method as in Example 1, except that CAB-O-SIL TS-530 fumed silica, a surface of which is treated with hexamethyldisilazane, was added in the amount of 2 wt % of the precursor.

Example 4

(Preparation of Spherical Non-graphitizable Carbon using Resin as a Precursor and a Hydrophobic Inorganic Substance as a Dispersion Media)

Spherical carbon was prepared by the same method as in Example 1, except that there was used 200 wt % of zeolite, a surface of which was made hydrophobic by refluxing zeolite Y and trimethylchlorosilane in a toluene solution for 16 hours while agitating the mixture.

Example 5

(Preparation of Spherical Non-graphitizable Carbon using Resin as a Precursor and a Hydrophobic Inorganic Substance as a Dispersion Media)

Spherical carbon was prepared by the same method as in Example 1, except that heat-treating was performed at 700° C. for 1 hour.

Example 6

(Preparation of Spherical Graphitizable Carbon using Pitch as a Precursor and a Hydrophobic Inorganic Substance as a Dispersion Media)

Spherical carbon was prepared by the same method as in Example 1, except that naphthalene isotropic pitch was used as a precursor.

Example 7

(Preparation of Spherical Carbon using a Mixture of Resin and Pitch as a Precursor and a Hydrophobic Inorganic Substance as a Dispersion Media)

Spherical carbon was prepared by the same method as in Example 1, except that there was used a mixture of phenolic resin and naphthanlene isotropic pitch as a precursor.

Example 8

Figure 2:
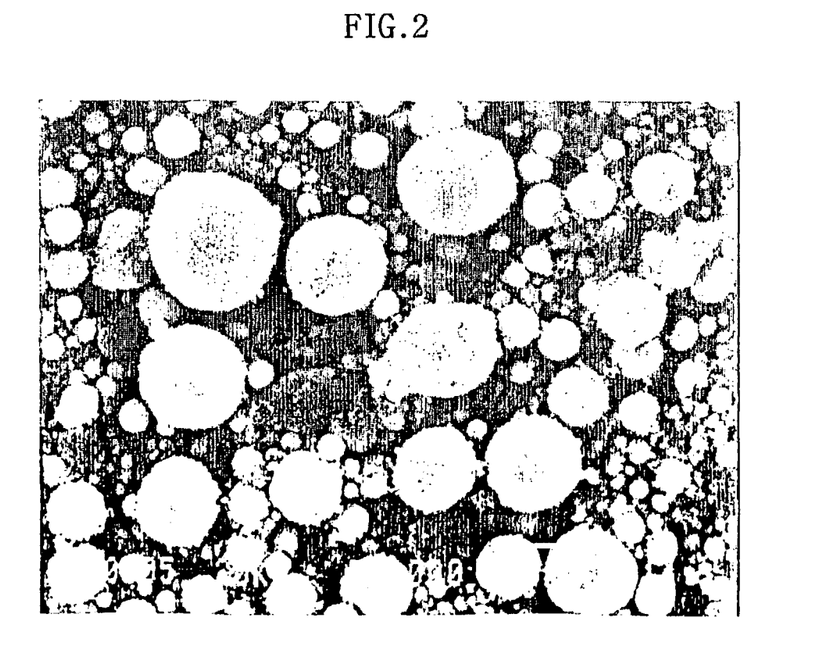
FIG. 2 is a photograph of the spherical carbon of Example 8 by Scanning Electron Microscopy with a magnifying power 1000.

Material of Example 6 was mixed in the same ratio, the mixture was heat-treated to 400° C. for 1 hour under argon gas atmosphere, and then heat-treated at 270° C. for 30 minutes under air atmosphere. The mixture was heat-treated again at 1000° C. for 1 hour under argon atmosphere to obtain spherical graphitizable carbon. FIG. 2 is a Scanning Electron Microscopy photograph of the prepared carbon.

Example 9

After introducing the spherical carbon prepared in Example 1 and a 48% hydrofluoric acid solution into a reaction vessel made from Teflon and removing an inorganic substance for 2 days, the mixture was washed with ultra-pure water and dried in a vacuum oven set at 120° C. for more than 12 hours.

Figure 3:
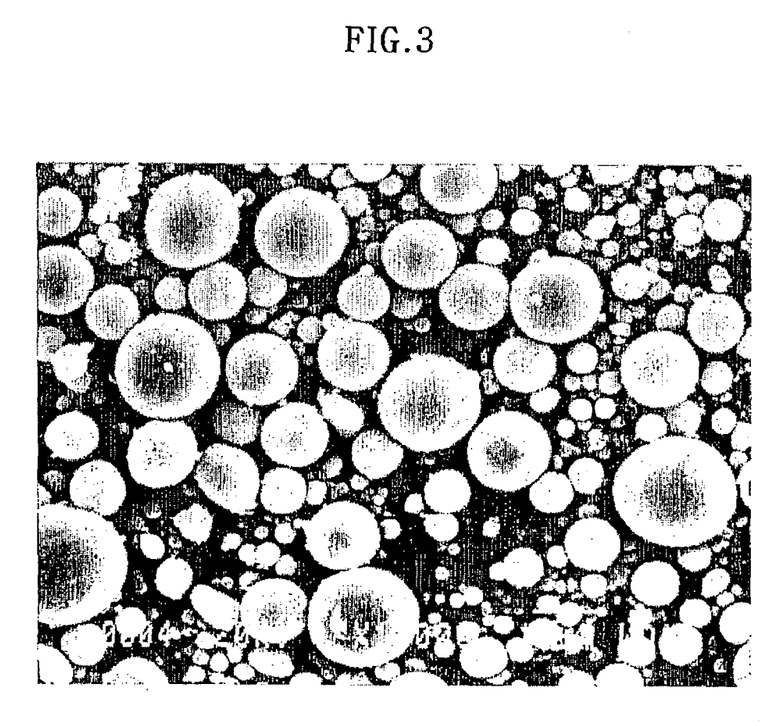
FIG. 3 is a photograph of the spherical carbon of Example 9 by Scanning Electron Microscopy with a magnifying power 1000.
Figure 4:
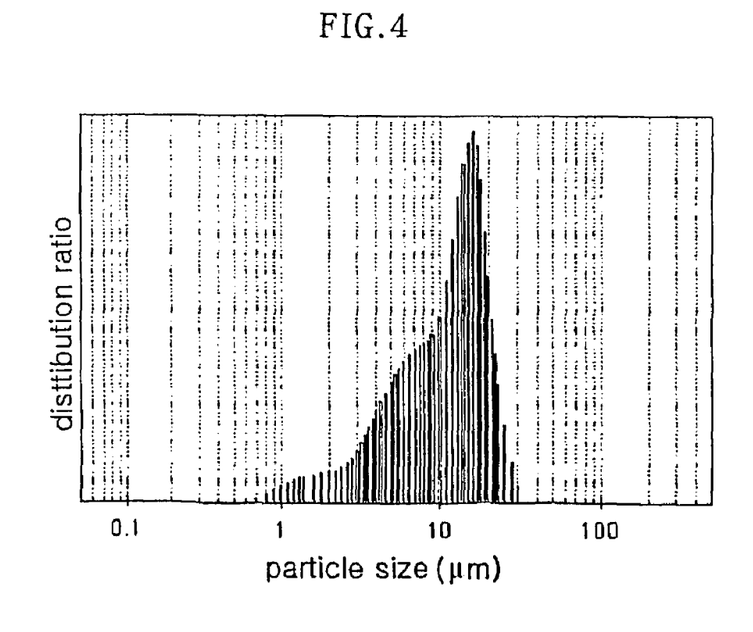
FIG. 4 is a particle size distribution chart of the spherical carbon of Example 9.

FIG. 3 is a Scanning Electron Microscopy photograph of the prepared carbon, and FIG. 4 is a particle size distribution chart. A tap density of the carbon is 0.87 g/cm$^3$ as measured by the ASTM Standard 527-93 method, and the specific surface area is 1.7 m$^2$/g as measured by the BET method. For reference, the particle size of g-MCMB presently used as anode material for a lithium secondary battery is 6 to 25 μm and the BET specific surface area of g-MCMB is 1.5 to 3.3 m$^2$/g.

Example 10

(Preparation of Artificial Graphite)

After introducing graphitizabie carbon prepared in Example 6 and a 48% hydrofluoric acid solution in a reaction vessel made from Teflon and removing an inorganic substance, the mixture was washed with ultra-pure water and dried in a vacuum oven set at 120° C. for more than 12 hours.

The dried carbon was introduced in a furnace set at 2800° C. and heat-treated for 2 hours to prepare spherical artificial graphite.

Example 11

(Lithium Secondary Battery using Spherical Carbon as an Electrode Active Material)

Spherical carbon prepared in Example 9 as an active material and polytetrafluoroethylene (PTFE) as a binder were mixed at a weight ratio of 10:0.5 to prepare a paste. The paste was adhered to a copper mesh current collector to prepare a working electrode, and the electrode was dried in a vacuum oven set at 120° C. for more than 12 hours.

LiCoO$_2$ was used as a counter electrode, lithium metal foil was used as a reference electrode, and 1 mole of LiPF$_6$/EC:DEC (volume ratio 1:1) was used as an electrolyte to prepare a beaker-shaped three electrode cell in a dry box under argon atmosphere, and a constant current constant voltage test for the cell was conducted at room temperature under the following conditions. Constant current was added to 0 V (vs. Li/Li+) at a current density of 20 mAg$^{-1}$ and constant voltage was added to 0 V to charge the cell until the current density became less than 1 mAg$^{-1}$, and discharge was conducted to 3 V (vs. Li/Li+) at a current density of 20 mAg$^{-1}$. A 5-minute open time was set between charge/discharge.

Figure 5:
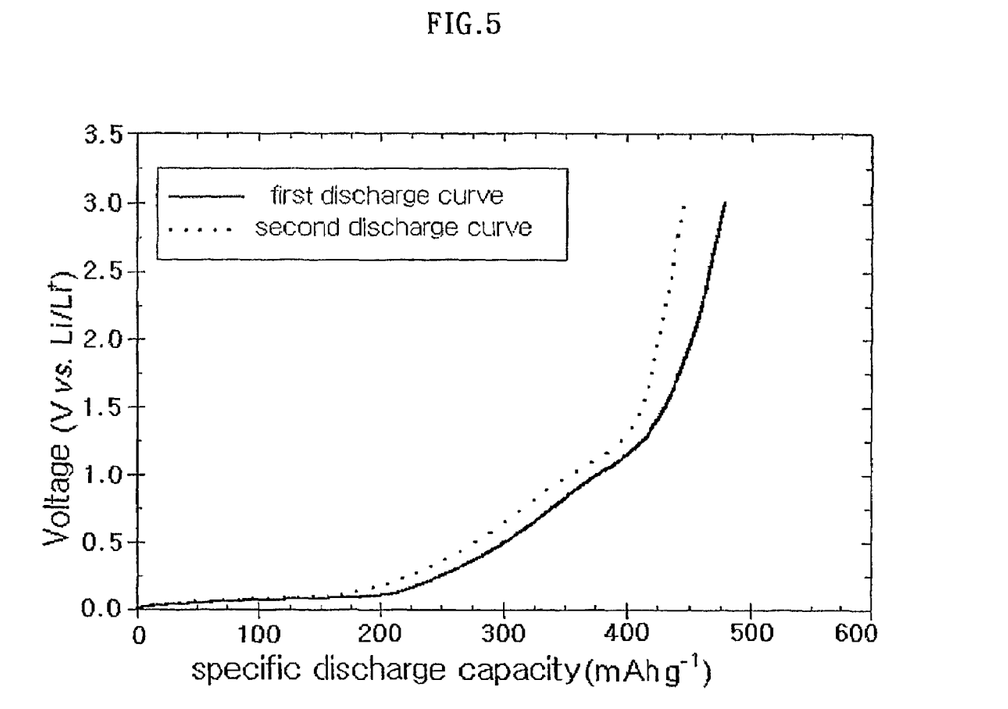
FIG. 5 is a first and second discharge curve graph of the battery of Example 11.
Figure 6:
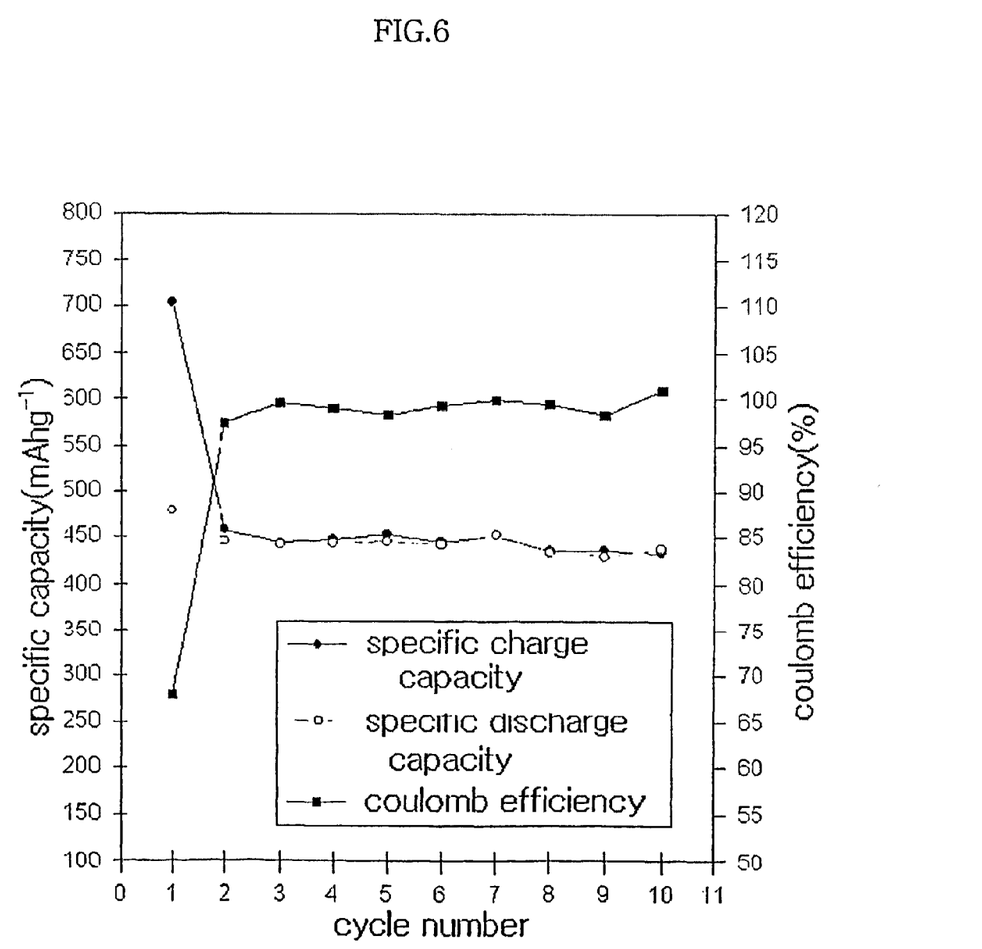
FIG. 6 is a graph showing a charge capacity, a discharge capacity and a coulomb efficiency by cycles of the battery of Example 11.

FIGS. 5 and 6 are graphs showing results of the test conducted under the above conditions. When charge/discharge was conducted 10 times, a reversible capacity of 450 mAh/g appeared and an initial coulomb efficiency increased to 68%, compared to 50 to 60% of an initial coulomb efficiency for the general non-graphitizable carbon.

Example 12

(Preparation of Spherical Artificial Graphite)

As a precursor, methylnaphthalene-derived anisotropic pitch (softening temperature=227° C.) was pulverized to several to several tens of micrometers to disperse the resulting particles in a silicone oil dispersion media The particles were then heat-treated at 300° C. for 1 hour under argon atmosphere.

The mixture of the pitch and silicone oil was filtered and silicone oil remaining on the surface of the pitch was washed with ethanol to remove the remaining silicone oil.

The spherical pitch underwent oxidative stabilization at 270° C. for 10 minutes under air atmosphere, and then was carbonized at 1000° C. for 1 hour under argon atmosphere to realize conversion into spherical graphitizable carbon.

Next, the graphitizable carbon was heat-treated at 3000° C. for 30 minutes under argon atmosphere to graphitize the carbon.

Figure 7:
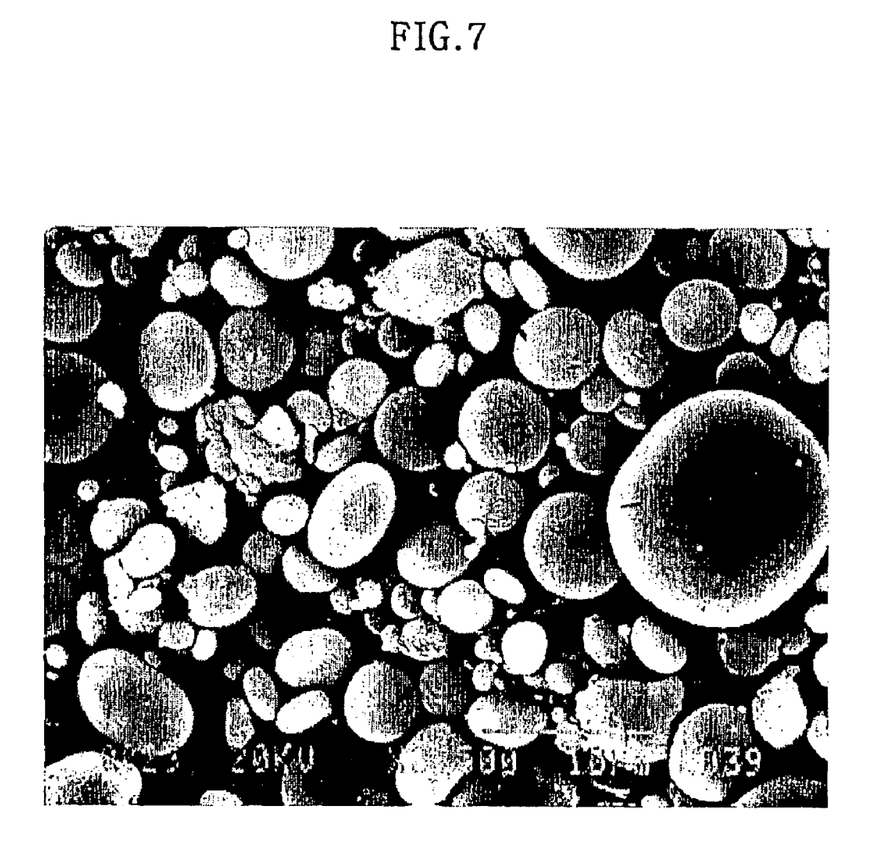
FIG. 7 is a photograph of the spherical artificial graphite of Example 12 by Scanning Electron Microscopy with a magnifying power of 2500.

The Scanning Electron Microscopy photograph of the spherical artificial graphite obtained by the above method is shown in FIG. 7. Table 1 shows a tap density and a specific surface area of the synthesized artificial graphite. Compared to graphitized MCMB 10-28 (g-MCMB, Graphitized Mesocarbon Microbeads, product of Japan Osaka Gas Chemicals Co., average particle size is 10 μm and graphitized at 2800° C.), it can be seen that the specific surface area is small and the tap density is high.

Example 13

Spherical anisotropic pitch having undergone oxidative stabilization in Example 12 was directly heat-treated to 3000° C. for 30 minutes under argon atmosphere (without undergoing carbonization at 1000° C.) to graphitize the pitch to prepare spherical artificial graphite.

Example 14

Phenolic resin (glass transition temperature=85° C.) was pulverized to several to several tens of micrometers to disperse the resin in silicone oil, and then heat-treated at 100° C. for 1 hour under argon atmosphere.

After filtering a mixture of spherical resin particles and silicone oil, remaining resin particles were washed with ethanol to remove the silicone oil.

Subsequently, the mixture was heat-treated at 1000° C. for 1 hour under argon atmosphere to realize conversion into spherical non-graphitizable carbon.

Table 1 shows the specific surface area and tap density of the synthesized non-graphitizable carbon.

TABLE 1

Comparison of g-MCMB 10-28, spherical artificial graphite and spherical non-graphitizable carbon

| Carbon type | Specific surface area ($m^2/g$) | Tap density ($g/cm^3$) |
|---|---|---|
| g-MCMB 10-28 | 2.5 | 1.41 |
| Spherical artificial graphite (Example 12) | 1.9 | 1.61 |
| Spherical non-graphitizable carbon (Example 14) | 1.8 | 0.86 |

In Table 1, the specific surface areas are obtained from nitrogen adsorption isothem and the tap densities are measured by ASTM No. B527-93.

Example 15

Spherical carbon was prepared by the same method as in Example 14, except that naphthalene isotropic pitch (softening temperature=165° C.) was used as a precursor and heat-treatment was conducted at 180° C. for 1 hour.

Example 16

Spherical carbon was prepared by the same method as in Example 14, except that a mixture of phenolic resin and naphthalene isotropic pitch was used as a precursor and heat-treatment was conducted at 180° C. for 1 hour.

Example 17

(Lithium Secondary Battery using Spherical Carbon as an Electrode Active Material)

The spherical artificial graphite prepared in Example 12 as active material and polytetrafluoroethylene (PTFE) as a binder were mixed at a weight ratio of 10:0.5 to prepare a paste, the paste was adhered to a copper mesh current collector to prepare a working electrode, and the electrode was dried in a vacuum oven set at 120° C. for more than 12 hours. $LiCoO_2$ was used as a counter electrode, lithium metal foil was used as a reference electrode, and 1 mole of $LiPF_6$/EC:DEC (volume ratio 1:1) was used as an electrolyte to prepare a beaker-shaped three electrode cell in a dry box under argon atmosphere.

Figure 8:
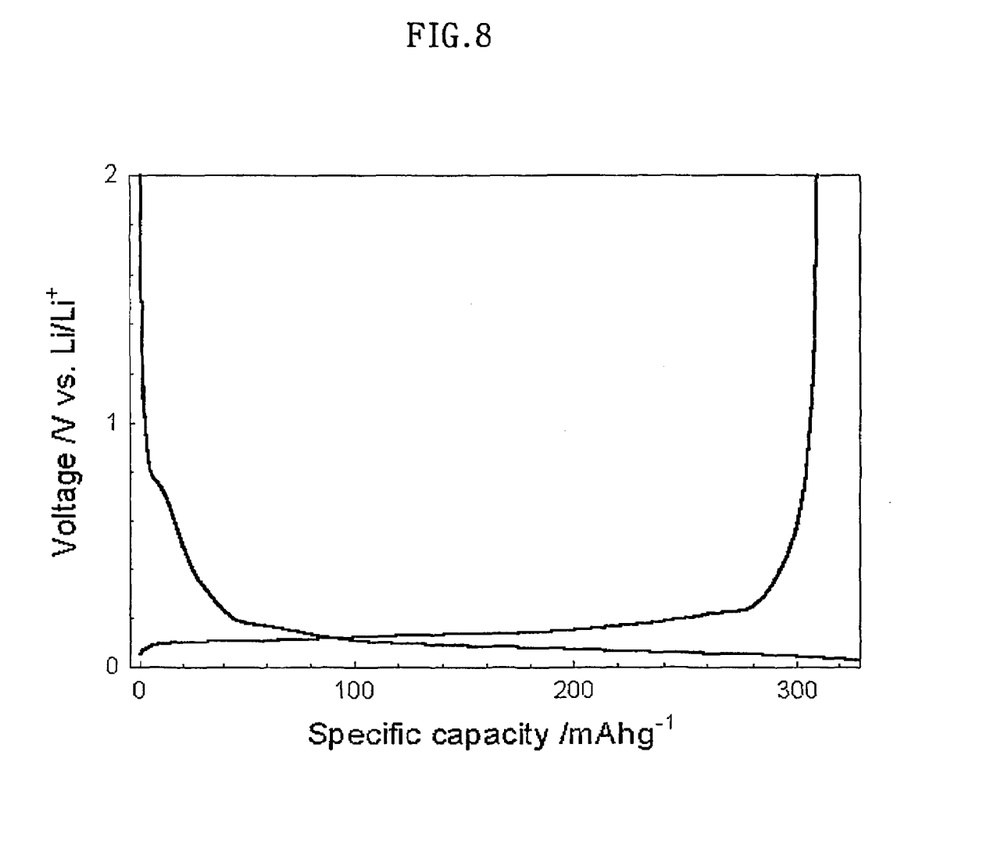
FIG. 8 is a one-time charge/discharge graph of a lithium secondary battery using the spherical artificial graphite of Example 17 as anode active material.
Figure 9:
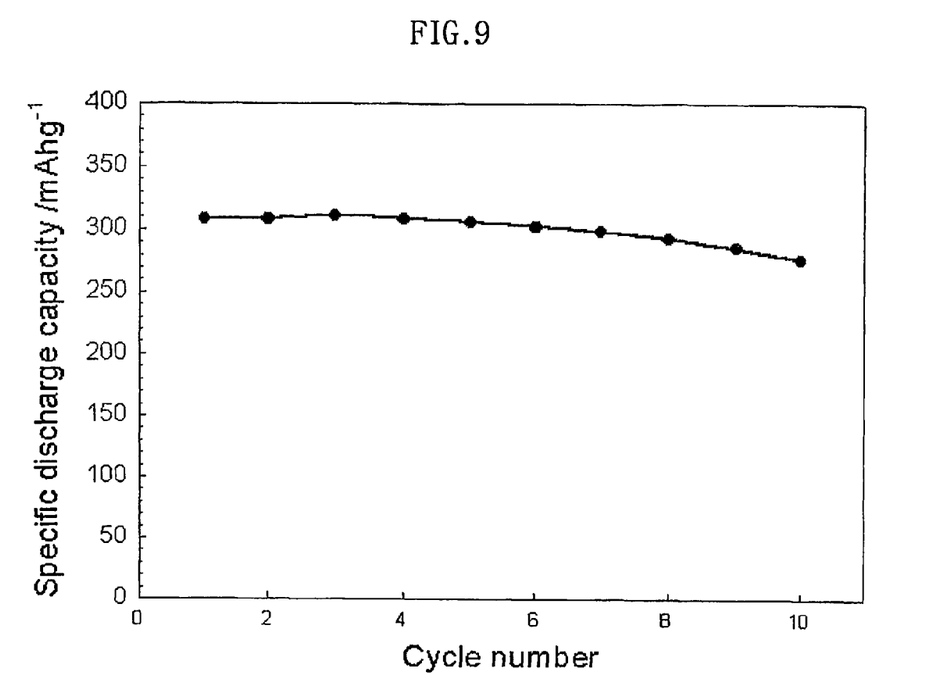
FIG. 9 is a ten times discharge capacity graph of a lithium secondary battery using the spherical artificial graphite of Example 17 as anode active material.

A constant current test was conducted for the cell at room temperature under the following conditions. Constant current was added to 0 V (vs. Li/Li+) at a current density of 30 $mAg^{-1}$ to charge the cell, and discharge was conducted to 2V (vs. Li/Li+) at a current density of 30 $mAg^{-1}$. A 5-minute open time was set between charge/discharge. FIG. 8 is a charge/discharge graph conducted under the above conditions, and FIG. 9 is a graph showing the results of reversibility. As results of charge/discharge, 308 mAh/g of reversible capacity appeared, initial coulomb efficiency was 89.3% and stable reversibility appeared till 10th charge/discharge.

Example 18

The spherical non-graphitizable carbon prepared in Example 14 as active material and polytetrafluoroethylene (PTFE) as a binder were mixed at a weight ratio of 10:0.5 to prepare a paste, the paste was adhered to a copper mesh current collector to prepare a working electrode, and the electrode was dried in a vacuum oven of 120° C. for more than 12 hours. $LiCoO_2$ was used as a counter electrode, lithium metal foil was used as a reference electrode and 1 mole $LiPF_6$/EC:DEC (volume ratio 1:1) was used as an electrolyte to prepare a beaker-shaped tree electrode cell in a dry box under argon atmosphere.

Constant current constant voltage test was conducted for the cell at room temperature under the following conditions. Constant current was added to 0 V (vs. Li/Li+) at a current density of 30 $mAg^{-1}$, and discharge was conducted to 2V (vs. Li/Li+) at a current density of 30 $mAg^{-1}$. A 5-minute open time was set between charge/discharge. The results of charge/discharge were as follows: a reversible capacity of 451 mAh/g appeared, an initial coulomb efficiency was 64.2%, and a stable reversibility appeared until $10^{th}$ charge/discharge.

Example 19

Figure 10:
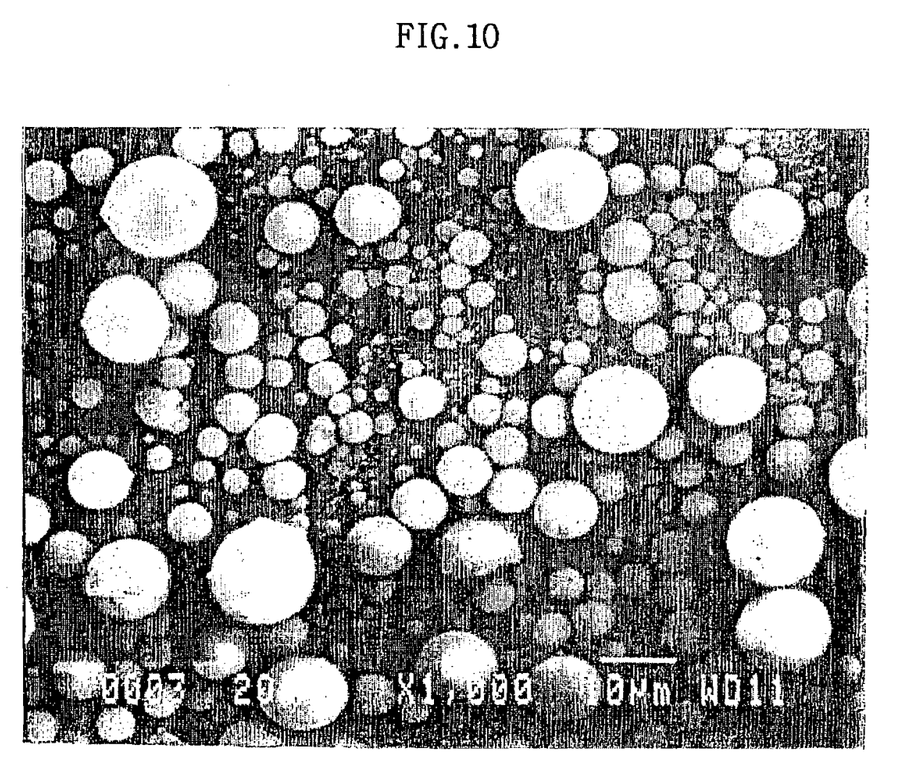
FIG. 10 is a photograph of the spherical carbon precursor of Example 18 by Scanning Electron Microscopy with a magnifying power of 1000.

Methyinaphthalene-derived anisotropic pitch (softening temperature=227° C.) was mixed with TS-530 silica, a surface of which was treated with hydrophobic inorganic substance hexamethyldisilzane, and the mixture was heat-treated at 280° C., which more than the softening temperature, for 1 hour under argon atmosphere to prepare a spherical carbon precursor. FIG. 10 is photograph of the prepared carbon precursor by Scanning Electronic Microscopy with a magnifying power of 1000.

The spherical carbon obtained in the present invention has high a tap density and a small specific surface area compared to non-spherical carbon. When used for anode active material for a lithium secondary battery, the spherical carbon of the present invention can increase the packing density and thus can increase battery capacity per unit volume, and can decrease initial irreversible capacity because it has a small specific surface area. Further, spherical artificial graphite can be prepared by graphitizing spherical graphitizable carbon in a simpler and more inexpensive process than that used for the existing g-MCMB.

What is claimed is:

1. A method for preparing spherical carbon comprising the step of
   heat-treating a mixture of a carbon precursor and a dispersion media, which dispersion media is a hydrophobic inorganic substance selected from silica, zeolite, alumina, titania or ceria, a surface of which is made hydrophobic.

2. The method for preparing spherical carbon according to claim 1, wherein the carbon precursor is selected from the group consisting of resin, pitch, and a mixture thereof.

3. The method for preparing spherical carbon according to claim 2, wherein the resin is selected from the group consisting of thermosetting synthetic resin selected from phenolic resin, furan resin, epoxy resin, polyacrylonitrile resin, polyimide resin, polybenzimidazole resin, polyphenylene resin and biphenol, a divinylbenzene styrene copolymer, cellulose, and a mixture thereof.

4. The method for preparing spherical carbon according to claim 2, wherein the pitch is petroleum pitch or coal tar pitch.

5. A method for preparing spherical non-graphitizable carbon comprising the steps of:
   a) heat-treating a mixture of a carbon precursor and a hydrophobic inorganic substance dispersion media at 700 to 1500° C. under inert atmosphere to carbonize the mixture; and
   b) adding an acid or alkali solvent to the a) carbonized mixture to remove inorganic substance.

6. The method for preparing spherical carbon according to claim 5, wherein the carbon precursor is selected from the group consisting of resin, pitch, and a mixture thereof.

7. The method for preparing spherical carbon according to claim 5, wherein the hydrophobic inorganic substance is silica, zeolite, alumina, titania or ceria, a surface of which surface is made hydrophobic.

8. A method for preparing spherical artificial graphite comprising the steps of:
   a) heat-treating a mixture of a carbon precursor and a hydrophobic inorganic substance dispersion media at 700 to 1500° C. under inert atmosphere to carbonize the mixture;
   b) adding an acid or alkali solvent to the a) carbonized mixture to remove inorganic substance; and
   c) heat-treating the b) spherical carbon at 2000 to 3200° C.

9. The method for preparing spherical graphite according to claim 8, wherein the carbon precursor is selected from the group consisting of resin, pitch, and a mixture thereof.

10. The method for preparing spherical graphite according to claim 8, wherein the hydrophobic inorganic substance is silica, zeolite, alumina, titania or ceria, a surface of which surface is made hydrophobic.

11. A method for preparing spherical artificial graphite comprising the steps of:
   a) heat-treating a mixture of a carbon precursor and a hydrophobic inorganic substance dispersion media at a temperature from a softening temperature of the carbon precursor to 600° C. to make the carbon precursor spherical;
   b) adding an acid or alkali solvent to the a) spherical carbon precursor to remove inorganic substance;
   c) performing oxidative stabilization of the b) spherical carbon precursor at 100 to 400° C. for 1 minute to 2 hours under air atmosphere;
   d) heat-treating the c) spherical carbon precursor at 700 to 1500° C. under inert atmosphere to carbonize the spherical carbon precursor; and
   e) heat-treating the d) spherical carbon at 2000 to 3200° C.

12. The method for preparing spherical graphite according to claim 11, wherein the carbon precursor is selected from the group consisting of resin, pitch, and a mixture thereof.

13. The method for preparing spherical graphite according to claim 11, wherein the hydrophobic inorganic substance is silica, zeolite, alumina, titania or ceria, a surface of which surface is made hydrophobic.

14. A method for preparing spherical artificial graphite comprising the steps of:
   a) heat-treating a mixture of a carbon precursor and a hydrophobic inorganic substance dispersion media at a temperature from a softening temperature of the carbon precursor to 600° C. to make the carbon precursor spherical;
   b) adding an acid or alkali solvent to the a) spherical carbon precursor to remove inorganic substance;
   c) performing oxidative stabilization of the b) spherical carbon precursor at 100 to 400° C. for 1 minute to 2 hours under air atmosphere; and
   d) heat-treating the c) spherical carbon at 2000 to 3200° C.

15. The method for preparing spherical graphite according to claim 14, wherein the carbon precursor is selected from the group consisting of resin, pitch, and a mixture thereof.

16. The method for preparing spherical graphite according to claim 14, wherein the hydrophobic inorganic substance is silica, zeolite, alumina, titania or ceria, a surface of which surface is made hydrophobic.

17. A method for preparing spherical artificial graphite comprising the steps of:
   a) heat-treating a mixture of a carbon precursor and a silicone oil dispersion media at a temperature from a softening temperature of the carbon precursor to 300° C. to make the carbon precursor spherical;
   b) adding an organic solvent to the a) spherical carbon precursor to remove silicone oil;
   c) performing oxidative stabilization of the b) spherical carbon precursor at 100 to 400° C. for 1 minute to 2 hours under air atmosphere; and
   d) heat-treating the c) spherical carbon precursor at 700 to 1500° C. under inert atmosphere to carbonize the spherical carbon precursor; and
   e) heat-treating the d) spherical carbon at 2000 to 3200° C.

18. The method for preparing spherical graphite according to claim 17, wherein the carbon precursor is selected from the group consisting of resin, pitch, and a mixture thereof.

19. A method for preparing spherical artificial graphite comprising the steps of:
   a) heat-treating a mixture of a carbon precursor and a silicone oil dispersion media at a temperature from a softening temperature of the carbon precursor to 300° C. to make the carbon precursor spherical;
   b) adding an organic solvent to the a) spherical carbon precursor to remove silicone oil;
   c) performing oxidative stabilization of the b) spherical carbon precursor at 100 to 400° C. for 1 minute to 2 hours under air atmosphere; and
   d) heat-treating the c) spherical carbon at 2000 to 3200° C.

20. The method for preparing spherical graphite according to claim 19, wherein the carbon precursor is selected from the group consisting of resin, pitch, and a mixture thereof.

* * * * *